US009757912B2

(12) United States Patent
Raleigh et al.

(10) Patent No.: US 9,757,912 B2
(45) Date of Patent: Sep. 12, 2017

(54) ONE-PIECE MULTI-LENS OPTICAL MEMBER WITH ULTRAVIOLET INHIBITOR AND METHOD OF MANUFACTURE

(71) Applicant: Cree, Inc., Durham, NC (US)

(72) Inventors: Craig Raleigh, Burlington, WI (US); Kurt Wilcox, Libertyville, IL (US)

(73) Assignee: Cree, Inc., Durham, NC (US)

( * ) Notice: Subject to any disclaimer, the term of this patent is extended or adjusted under 35 U.S.C. 154(b) by 199 days.

(21) Appl. No.: 14/470,786

(22) Filed: Aug. 27, 2014

(65) Prior Publication Data

US 2016/0061416 A1    Mar. 3, 2016

(51) Int. Cl.
| F21V 29/00 | (2015.01) |
| B29D 11/00 | (2006.01) |
| F21V 5/00 | (2015.01) |
| B29C 45/00 | (2006.01) |
| B29K 69/00 | (2006.01) |
| F21Y 105/10 | (2016.01) |
| F21Y 115/10 | (2016.01) |
| B29C 45/16 | (2006.01) |

(52) U.S. Cl.
CPC ...... *B29D 11/0073* (2013.01); *B29C 45/0001* (2013.01); *B29C 45/0053* (2013.01); *F21V 5/007* (2013.01); *B29C 45/16* (2013.01); *B29K 2069/00* (2013.01); *F21Y 2105/10* (2016.08); *F21Y 2115/10* (2016.08)

(58) Field of Classification Search
CPC . F21V 9/06; F21V 29/70; F21V 15/00; F21V 19/001; B29D 11/0073; F21K 9/50; B29K 2069/00; B29K 2995/0031

USPC ............................. 362/294, 249.02, 373, 235
See application file for complete search history.

(56) References Cited

U.S. PATENT DOCUMENTS

| 1,004,585 A | 10/1911 | Mulholland et al. |
| 1,024,695 A | 4/1912 | Mulholland |
| 2,212,876 A | 8/1940 | Chauvet |

(Continued)

FOREIGN PATENT DOCUMENTS

| WO | 2008144672 A1 | 11/2008 |
| WO | 2010095068 A2 | 8/2010 |
| WO | 2011091529 A1 | 8/2011 |

*Primary Examiner* — Andrew Coughlin
*Assistant Examiner* — Jessica M Apenteng
(74) *Attorney, Agent, or Firm* — Jansson Munger McKinley & Kirby Ltd.

(57) ABSTRACT

An LED light fixture includes a heat-sink, a circuit board thereon with a plurality of spaced LED light sources, and a one-piece optical member with a plurality of secondary lenses over corresponding LED light sources and having a lens flange surrounding the lenses and integral with each lens. The optical member includes a polymeric carrier portion surrounding the lenses, overlapping with and molded onto the lens flanges across such overlapping, and extending therefrom to a peripheral edge portion. The optical member has an outer surface infused with an ultraviolet inhibitor to increase long-term weathering performance. The infused outer surface includes an outer layer of each lens and extends to form an outer layer of the lens flanges and therebeyond to form an outer layer of the carrier portion. The invention also includes a method of manufacturing such infused optical member.

23 Claims, 11 Drawing Sheets
(2 of 11 Drawing Sheet(s) Filed in Color)

(56) References Cited

U.S. PATENT DOCUMENTS

| | | | |
|---|---|---|---|
| 2,254,961 A | 9/1941 | Harris | |
| 2,544,413 A | 3/1951 | Bouwers | |
| 4,186,995 A | 2/1980 | Schumacher | |
| 4,474,437 A | 10/1984 | Gorenstein | |
| 4,537,474 A | 8/1985 | Astero | |
| 4,561,736 A | 12/1985 | Furter et al. | |
| 4,738,516 A | 4/1988 | Verhoeven et al. | |
| 5,302,778 A | 4/1994 | Maurinus | |
| 5,494,615 A | 2/1996 | Wang Lee | |
| 6,033,087 A | 3/2000 | Shozo et al. | |
| 6,123,889 A | 9/2000 | Katagiri et al. | |
| 6,273,596 B1 | 8/2001 | Parkyn et al. | |
| 6,356,395 B1 | 3/2002 | Tawa et al. | |
| 6,395,201 B1 | 5/2002 | Hunt et al. | |
| 6,499,870 B1 | 12/2002 | Zwick et al. | |
| 6,502,956 B1 | 1/2003 | Wu | |
| 6,547,423 B2 | 4/2003 | Marshall et al. | |
| 6,598,998 B2 | 7/2003 | West et al. | |
| 6,616,299 B2 | 9/2003 | Martineau | |
| 6,679,621 B2 | 1/2004 | West et al. | |
| 6,837,605 B2 | 1/2005 | Reill | |
| 6,896,381 B2 | 5/2005 | Benitez et al. | |
| 7,153,000 B2 | 12/2006 | Park et al. | |
| 7,153,002 B2 | 12/2006 | Kim et al. | |
| 7,181,378 B2 | 2/2007 | Benitez et al. | |
| 7,227,703 B2 | 6/2007 | Chen | |
| 7,246,931 B2 | 7/2007 | Hsieh et al. | |
| 7,352,011 B2 | 4/2008 | Smits et al. | |
| 7,365,916 B2 | 4/2008 | Sato et al. | |
| 7,391,580 B2 | 6/2008 | Maresse | |
| 7,411,742 B1 | 8/2008 | Kim et al. | |
| 7,549,769 B2 | 6/2009 | Kim et al. | |
| 7,722,196 B2 | 5/2010 | Caire et al. | |
| 7,766,509 B1 | 8/2010 | Laporte | |
| 7,766,530 B2 | 8/2010 | Hwang et al. | |
| 7,874,703 B2 | 1/2011 | Shastry et al. | |
| 7,922,370 B2 | 4/2011 | Zhang et al. | |
| 8,215,814 B2 | 7/2012 | Marcoux | |
| 8,339,716 B2 | 12/2012 | Premysler | |
| 2002/0034081 A1* | 3/2002 | Serizawa | B60Q 1/2696 362/540 |
| 2002/0067549 A1 | 6/2002 | Tawa et al. | |
| 2003/0169504 A1 | 9/2003 | Kaminsky et al. | |
| 2003/0235050 A1 | 12/2003 | West et al. | |
| 2004/0246606 A1 | 12/2004 | Benitez et al. | |
| 2005/0073840 A1 | 4/2005 | Chou et al. | |
| 2005/0086032 A1 | 4/2005 | Benitez et al. | |
| 2005/0231812 A1 | 10/2005 | Leu et al. | |
| 2006/0034082 A1 | 2/2006 | Park et al. | |
| 2006/0232881 A1 | 10/2006 | Hayakawa et al. | |
| 2006/0252169 A1 | 11/2006 | Ashida | |
| 2007/0058369 A1 | 3/2007 | Parkyn et al. | |
| 2007/0070530 A1 | 3/2007 | Seo et al. | |
| 2008/0084693 A1 | 4/2008 | Shimada et al. | |
| 2008/0089210 A1 | 4/2008 | Saito et al. | |
| 2008/0151550 A1 | 6/2008 | Liu et al. | |
| 2008/0198604 A1 | 8/2008 | Kim et al. | |
| 2008/0203415 A1 | 8/2008 | Thompson et al. | |
| 2008/0239722 A1 | 10/2008 | Wilcox | |
| 2008/0285136 A1 | 11/2008 | Jacobowitz et al. | |
| 2008/0294254 A1 | 11/2008 | Cumming et al. | |
| 2008/0297020 A1 | 12/2008 | Wanninger et al. | |
| 2008/0298056 A1 | 12/2008 | Petersen | |
| 2009/0052192 A1 | 2/2009 | Kokubo et al. | |
| 2009/0159915 A1 | 6/2009 | Branchevsky | |
| 2010/0002449 A1 | 1/2010 | Lin | |
| 2010/0039810 A1 | 2/2010 | Holder et al. | |
| 2010/0163909 A1 | 7/2010 | Chen et al. | |
| 2010/0207140 A1 | 8/2010 | Rudaz et al. | |
| 2010/0238669 A1 | 9/2010 | Holder et al. | |
| 2010/0271708 A1 | 10/2010 | Wilcox | |
| 2011/0103051 A1* | 5/2011 | Wilcox | F21S 2/005 362/235 |
| 2011/0157891 A1* | 6/2011 | Davis | B29C 45/14467 362/244 |
| 2011/0176301 A1 | 7/2011 | Liang et al. | |
| 2011/0242823 A1* | 10/2011 | Tracy | F21V 3/02 362/351 |
| 2011/0267822 A1 | 11/2011 | Harbers et al. | |
| 2012/0014115 A1 | 1/2012 | Park et al. | |
| 2012/0091487 A1 | 4/2012 | Chan et al. | |
| 2012/0170280 A1 | 7/2012 | Choquet | |
| 2012/0201031 A1 | 8/2012 | Marley | |
| 2012/0294011 A1 | 11/2012 | Cattoni et al. | |
| 2012/0319592 A1 | 12/2012 | Riesebosch | |
| 2012/0319616 A1 | 12/2012 | Quilici et al. | |

* cited by examiner

FIG. 12 ved by the lens layer of polycarbonate material and is infused with a UV inhibitor. Use of a UV inhibitor infused polycarbonate allows excellent pre-

ONE-PIECE MULTI-LENS OPTICAL MEMBER WITH ULTRAVIOLET INHIBITOR AND METHOD OF MANUFACTURE

FIELD OF THE INVENTION

The invention relates generally to the field of LED (light emitting diode) light fixtures and, more particularly, to optical members for such fixtures with LED light sources, and, still more particularly, to polymeric optical members infused with an ultraviolet inhibitor for use in LED light fixtures.

BACKGROUND OF THE INVENTION

There is a need for lighting apparatus for a variety of general lighting purposes which is low-cost and energy-efficient. LED light sources are energy-efficient, and advances in LED technology are providing even greater efficiencies over time. One important aspect of LED light fixtures is the so-called secondary lensing that directs light received from LED light sources. As used herein, the term "LED light source" refers to an LED or a small grouping of LEDs alone, or more typically to what is referred to as an LED package—namely, an LED (or small grouping of LEDs) with what is referred to as a primary lens formed thereon. Secondary lenses, which receive and direct light from LED light sources, are of significant importance to LED light fixtures in many ways.

Secondary lenses play a major role, of course, in the direction of light from a light fixture, and so determine the degree and spread of illumination, and overall optical efficiency. The forming and shaping of secondary lenses are typically important considerations with respect to the usefulness of an LED fixture, and play a significant role in overall product cost. Improvements in secondary lensing members, their optical capabilities, and their manufacture are important considerations in the field of LED light fixtures.

LED light fixtures for a wide variety of both specific and general lighting applications typically have a plurality of LED light sources, usually positioned in spaced relationship to one another on a board (e.g., a circuit board), and a secondary lens is aligned with each LED light source. Such secondary lenses are in some cases part of a one-piece optical member that has a plurality of secondary lens portions each surrounded by and interconnected by a non-lens portion. Improvements in such multi-secondary-lens members, the optical capabilities of the secondary lens portions, and the manufacture of such members are important considerations in the field of LED light fixtures. More specifically, speed (and therefore cost) and accuracy of manufacture are particularly important considerations.

With the rapid development of high-performance LED lighting fixtures for a wide variety of general and specific lighting tasks and with the varying requirements for secondary lensing in such fixtures, there is a need for a system which enables quick and accurate manufacture of one-piece optical members each having different requirements for their secondary-lens portions.

There is also a need for lenses which are able to withstand prolonged weathering and ultraviolet ("UV") exposure. Lenses made of polycarbonate are often used for their durability and flammability properties, however, polycarbonate has a poor resistance to UV and is susceptible to yellowing and degradation. For this reason, most outdoor optical lenses are made of acrylic (polymethyl methacrylate) ("PMMA"). PMMA however, has poor impact qualities and cannot pass required flammability tests for enclosure ratings. This has oftentimes forced manufacturers to compromise by adding a glass cover over PMMA lenses. A major drawback to this is that optical distribution and efficiency as well as cost of manufacture are all compromised.

It would be beneficial to provide optical members for LED light fixtures which are low in cost as well as highly durable to prolonged UV exposure and resistant to yellowing, and which contribute to the overall economy and efficiency of LED light fixtures.

SUMMARY OF THE INVENTION

The present invention is an improved one-piece optical member, secondary lensing, and LED light fixtures with such secondary lensing and infused with a UV inhibitor, as well as a method of manufacturing such one-piece optical members. These address the above-noted needs, concerns and considerations and serve to improve product quality and efficiency and reduce manufacturing costs of high-performance LED light fixtures.

One aspect of this invention is an improved LED light fixture of the type including (a) a heat-sink structure having a mounting surface, (b) a circuit board that is on the mounting surface and has a plurality of LED light sources spaced thereon, and (c) a one-piece optical member over the circuit board which has a plurality of secondary lenses thereon each for alignment with a corresponding one of the light sources. Each of the lenses has at least one layer of a polymeric material, the polymeric material extends into the lens flange that surrounds and is integral with each lens and the polymeric carrier portion which surrounds the lenses, overlaps with and is molded onto the lens flanges across such overlapping, and extending laterally therefrom to a peripheral edge portion.

In the improved LED light fixture, the optical member has an outer surface infused with an ultraviolet inhibitor to increase long-term weathering performance. The infused outer surface includes an outer layer of each lens and extends to form an outer layer of the lens flanges and therebeyond to form an outer layer of the carrier portion. The lenses as well as the lens flanges and carrier portion are infused with an ultraviolet inhibitor layer. The ultraviolet inhibitor layer increases long-term weathering performance, including preventing against yellowing and UV degradation.

In certain embodiments, the at least one lens layer and the carrier are made of polycarbonate and infused with a UV inhibitor. In certain other embodiments, the at least one lens layer is of a first polymeric material and the carrier is of a second polymeric material. In some embodiments, the first polymeric material is an acrylic and the second polymeric material is a polycarbonate or vice versa. In some other embodiments, the at least one lens layer and the carrier are of the same polymeric material.

In some embodiments, each lens has at least two layers of polymeric material. And, in some of such embodiments, at least two of the lens layers are of the same polymeric material—e.g., polycarbonate, acrylic or cyclic olefin copolymer (COC).

In other embodiments, at least two of the lens layers are of the different polymeric materials. In some of such embodiments, one of the lens layers is an acrylic and at least one other lens layer is polycarbonate. In some of these embodiments, the lens layer of polycarbonate material is the innermost layer and is infused with a UV inhibitor. Use of a UV inhibitor infused polycarbonate allows excellent precision in the intended light-directing functions of the lens portions of the unitary optic member, even while providing time and cost-related manufacturing advantages and significantly decreases the amount of yellowing and degradation from UV exposure.

In certain embodiments of this invention, each of the lenses has three layers of polymeric material. The layers may be of the same polymeric material, or may be different.

In the multi-layer lenses in this invention, each lens defines a lens optical footprint and at least one of the layers in each lens may be less than coextensive with the lens optical footprint. As used herein, the term "lens optical footprint" means the largest light-passage area within the lens and orthogonal to the axis of the light source. In embodiments in which one of the layers is less than coextensive with the lens optical footprint, another of the layers may include a flange extending beyond the lens optical footprint.

Another aspect of this invention is a one-piece optical member of the type described above as a member of an LED light fixture.

Still another aspect of this invention is a method for manufacturing a one-piece optical member having plural spaced lenses. The method comprises the steps of: providing a plurality of lenses each of which has at least one layer of a polymeric material extending into a lens flange of such material that surrounds the lens; placing the plurality of lenses in spaced positions of a mold for injection molding; injection molding a polymeric carrier portion of the one-piece optical member such that the carrier portion surrounds the lenses, overlaps and is molded onto to the lens flanges across such overlapping, and extends laterally therefrom to a peripheral edge portion; and infusing the plurality of lenses and polymeric carrier portion with an ultraviolet inhibitor to increase long-term durability.

In some embodiments of the method, the lenses and carrier are polycarbonate. In other embodiments of the method, the lenses have at least one lens layer of a first polymeric material which material extends into the lens flanges and the carrier is of a second polymeric material. In some of such embodiments, the first polymeric material is an acrylic and the second polymeric material is a polycarbonate or vice versa.

In some embodiments of the method, the step of providing a plurality of lenses further includes selecting lenses from a group of lenses having different optical properties. The group of lenses may include subgroups, lenses of each subgroup having the same optical properties but with optical properties differing from group to group. The selecting steps may include selecting lenses, all of which have the same optical properties.

As used herein in referring to the optical member with its plurality of spaced, flanged secondary lenses, the term "one-piece" means that the portions of the carrier portion which surround the lenses and overlap the lens flanges are overmolded onto such lens flanges such that the layer-to-layer interface is bonded in the overmolding process; and, for those optical members of this invention for which the lenses have plural layers, the layer-to-layer interfaces are bonded in overmolding as well.

As used herein, the term "outermost layer" refers to the layer farthest from the LED light source, or at least the last layer through which light from such light source passes. And the term "innermost layer" refers to the layer closest to the LED light source, or at least the first layer through which light from such light source passes.

As used herein, the term "outer surface" refers to the surface of the optical member exposed to the atmosphere, including the last light emitting surface of the lenses and the surfaces adjacent thereto.

In descriptions of this invention, including in the claims below, the terms "comprising," "including" and "having" (each in their various forms) and the term "with" are each to be understood as being open-ended, rather than limiting, terms.

BRIEF DESCRIPTION OF THE DRAWINGS

The patent or application file contains two photographs executed in color. Copies of this patent or patent application publication with color photographs will be provided by the Office upon request and payment of the necessary fee.

DETAILED DESCRIPTION OF EXEMPLARY EMBODIMENTS

Figure 1:
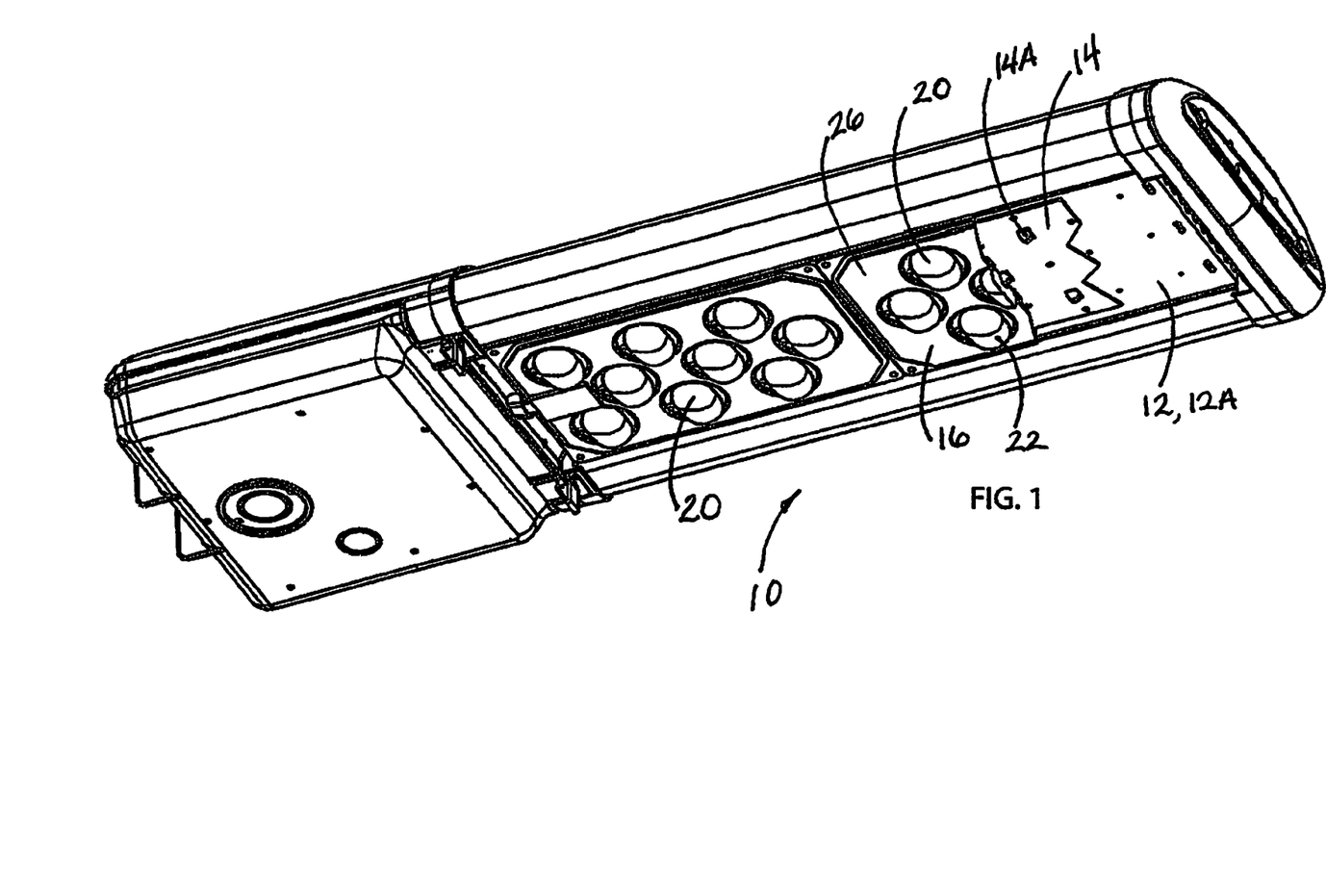
FIG. 1 is a perspective view of an LED light fixture having two one-piece optical members, such fixture and optical members being in accordance with this invention.
Figure 1A:
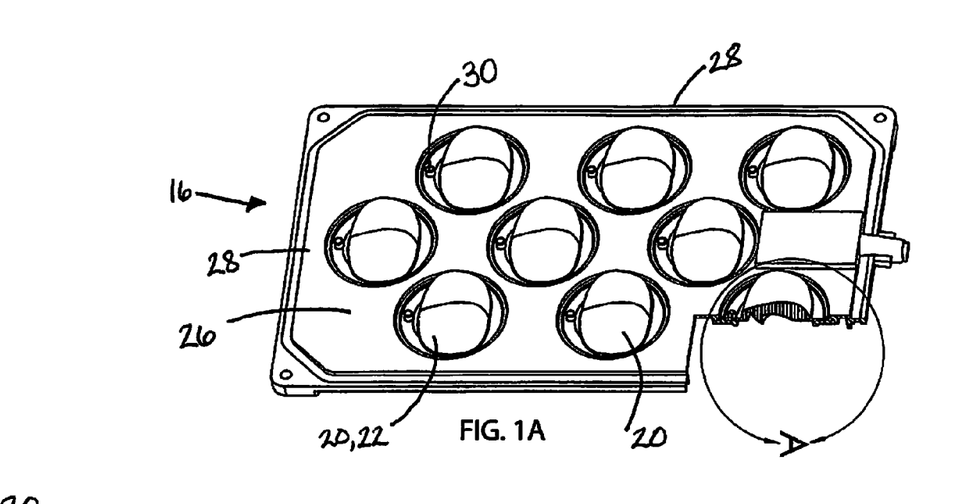
FIG. 1A is a perspective view of a one-piece optical member of the LED lighting fixture of FIG. 1.
Figure 1B:
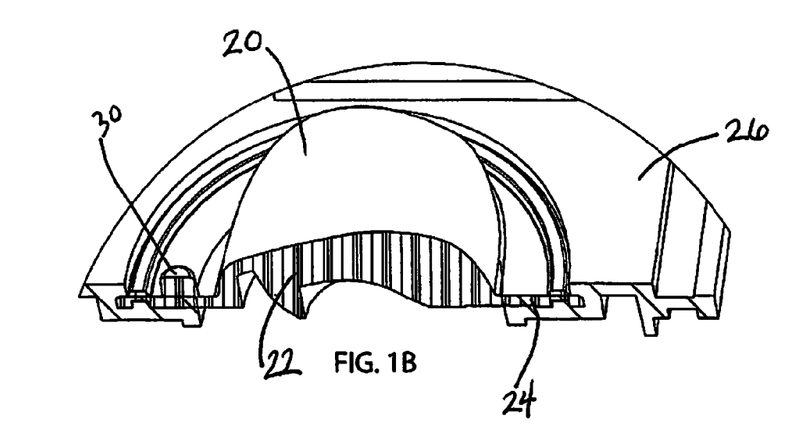
FIG. 1B is an enlarged cross-sectional perspective view of one portion of the one-piece optical member of FIG. 1A, illustrating one secondary lens.

FIGS. 1, 1A-1C and 10A-10B illustrate an LED lighting fixture 10 in accordance with this invention. LED light fixture 10 includes a heat-sink structure 12 that has a mounting surface 12A on which a circuit board 14 is mounted. Circuit board 14 has a plurality of LED light sources 14A spaced thereon. A one-piece optical member 16 is positioned over circuit board 14 and has a plurality of secondary lenses 20 thereon, each for alignment with a corresponding one of light sources 14A. Optical member 16 includes lens flanges 24 surrounding and integral with each lens 20, and polymeric carrier portion 26 surrounding the lenses 20, overlapping with and molded onto the lens flanges 24 across such overlapping, and extending laterally therefrom to peripheral edge portion 28. FIG. 1B best illustrates the above-described characteristics.

Figure 10A:
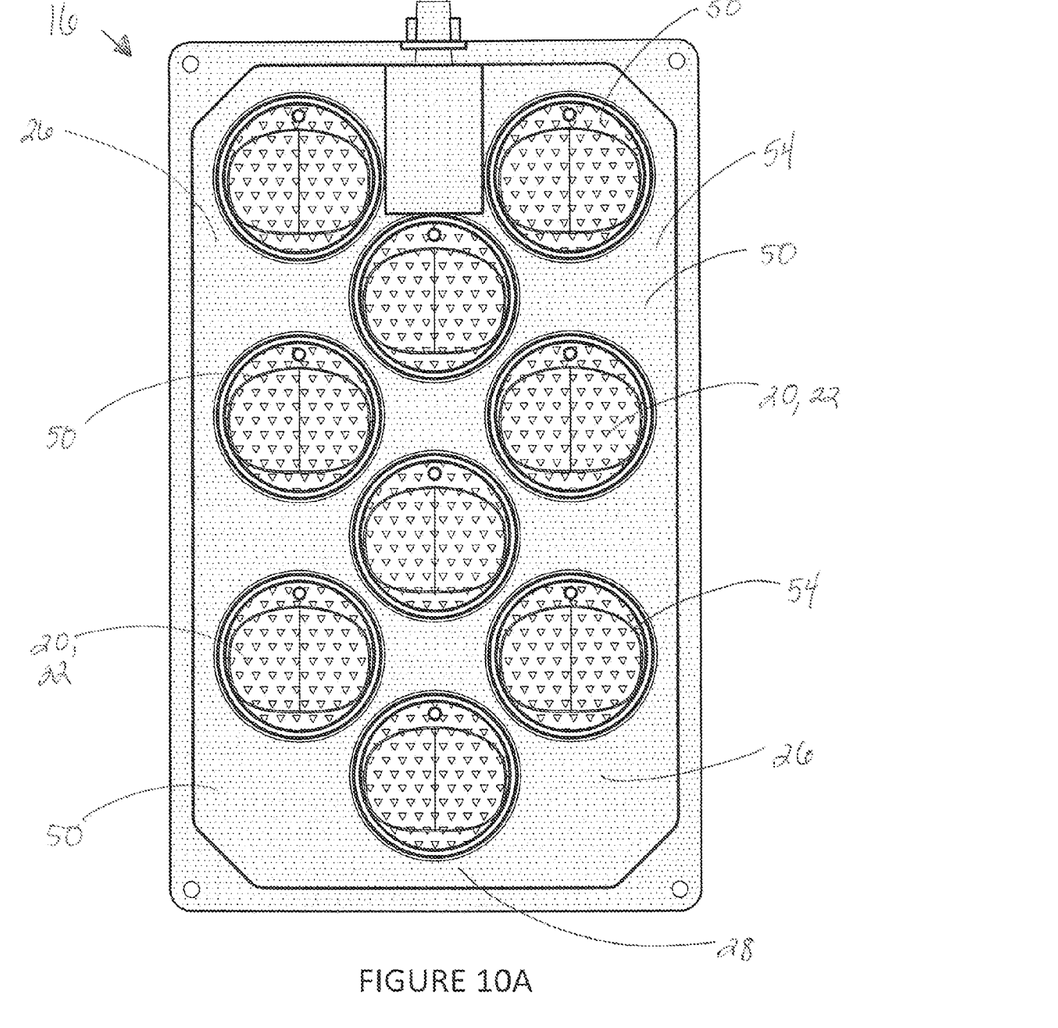
FIG. 10A is a perspective view of the one-piece optical member of the LED lighting fixture of FIG. 1 but infused with the UV inhibitor.
Figure 10B:
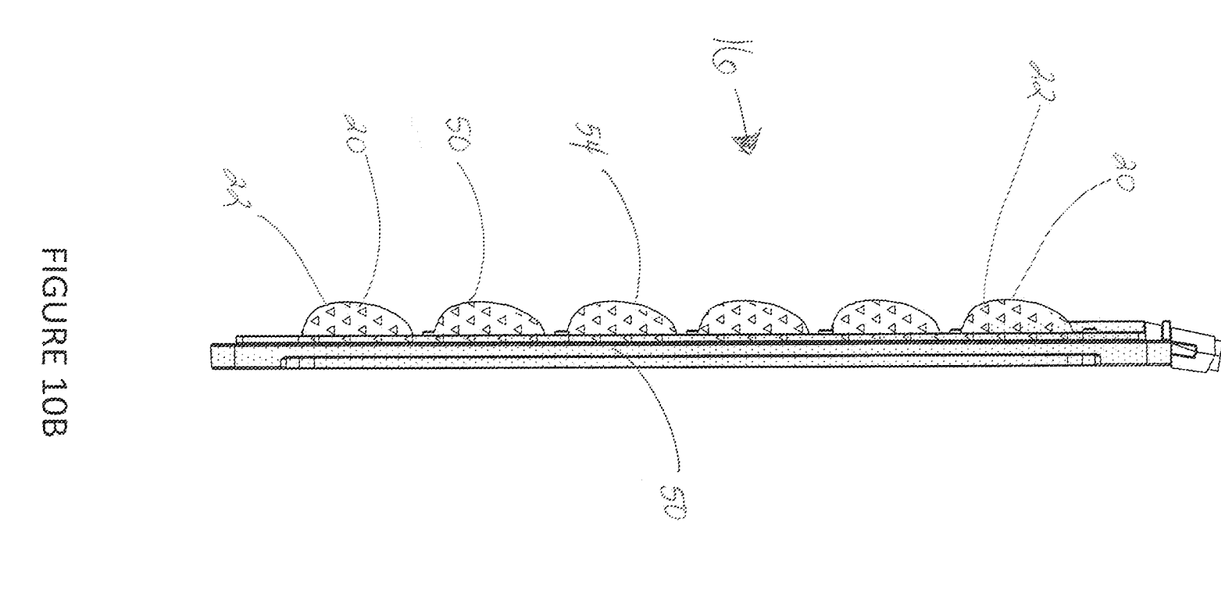
FIG. 10B is a side view of the one-piece optical member of the LED lighting fixture of FIG. 1 but infused with the UV inhibitor.

In the improved LED light fixture, optical member 16 has an outer surface 54 infused with ultraviolet inhibitor 50 to increase long-term weathering performance. Infused outer surface 54 includes including an outer layer of each lens 20 and extends extending to form an outer layer of lens flanges 24 and therebeyond to form an outer layer of carrier portion 26. Lenses 20 as well as lens flanges 24 and carrier portion 26 are infused with ultraviolet inhibitor layer 50. Ultraviolet inhibitor layer 50 increases long-term weathering performance including preventing against yellowing and UV degradation as seen in FIGS. 10A-10B and the comparative photographs below.

Underwriter's Laboratories had indicated that polycarbonate is a good material for LED lenses, however, ultraviolet exposure along with high humidity and temperatures can cause significant yellowing and breakdown of the polycarbonate material.

Figure 11:
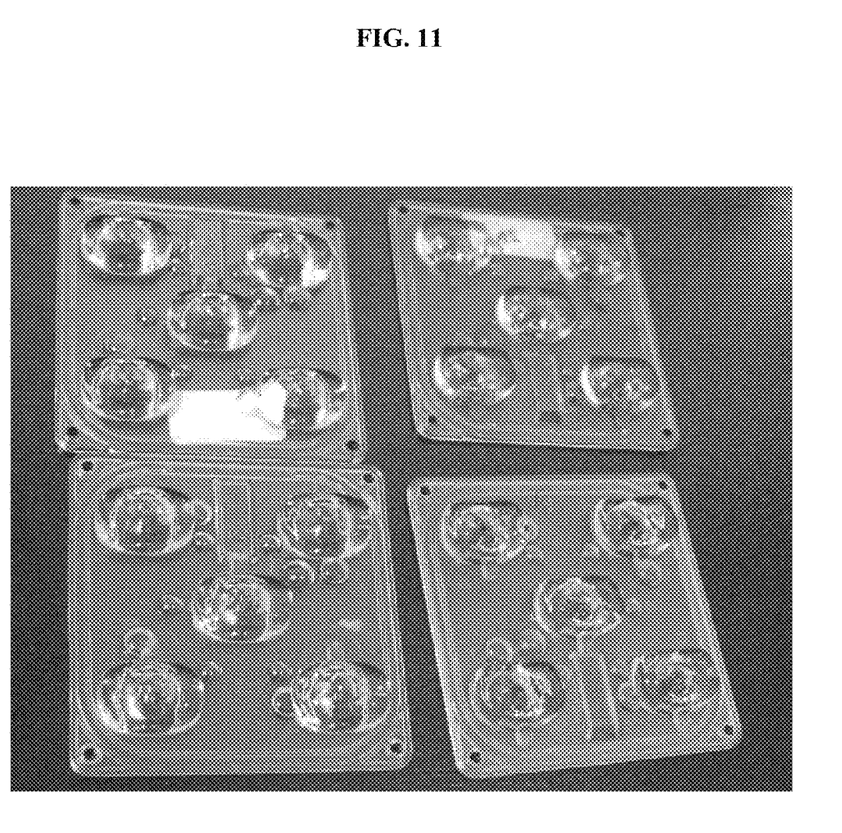
FIG. 11 is a photograph of four images each having an optical member which are integrally-formed pieces (i.e., the five lenses and the flange portions therebetween which extend to the edge of each optical member are of a polycarbonate material).

The four images pictured in FIG. 11 each involve an optical member which is an integrally-formed piece; i.e., the five lenses and the flange portions therebetween which extend to the edge of each optical member are of a polycarbonate material. The two optical members on the right in FIG. 11 were made with the UV inhibitor dispersed throughout the polycarbonate, while the two optical members on the left each have an outer surface infused with the UV inhibitor. Of each vertical pair of optical members, the lower optical member is shown as made and before accelerated exposure to UV, humidity and elevated temperature, and, the upper optical member is shown as it appears after accelerated exposure to UV, humidity and elevated temperature.

As can be seen, the optical member in FIG. 11 with dispersed UV inhibitor is seriously yellowed thereacross and therefore, has become disadvantageous for its intended purpose. In contrast, the optical member in FIG. 11 having an outer surface infused with the UV inhibitor has little evidence of any degradation, so is capable of fulfilling its intended purpose for a much longer period of time.

Figure 12:
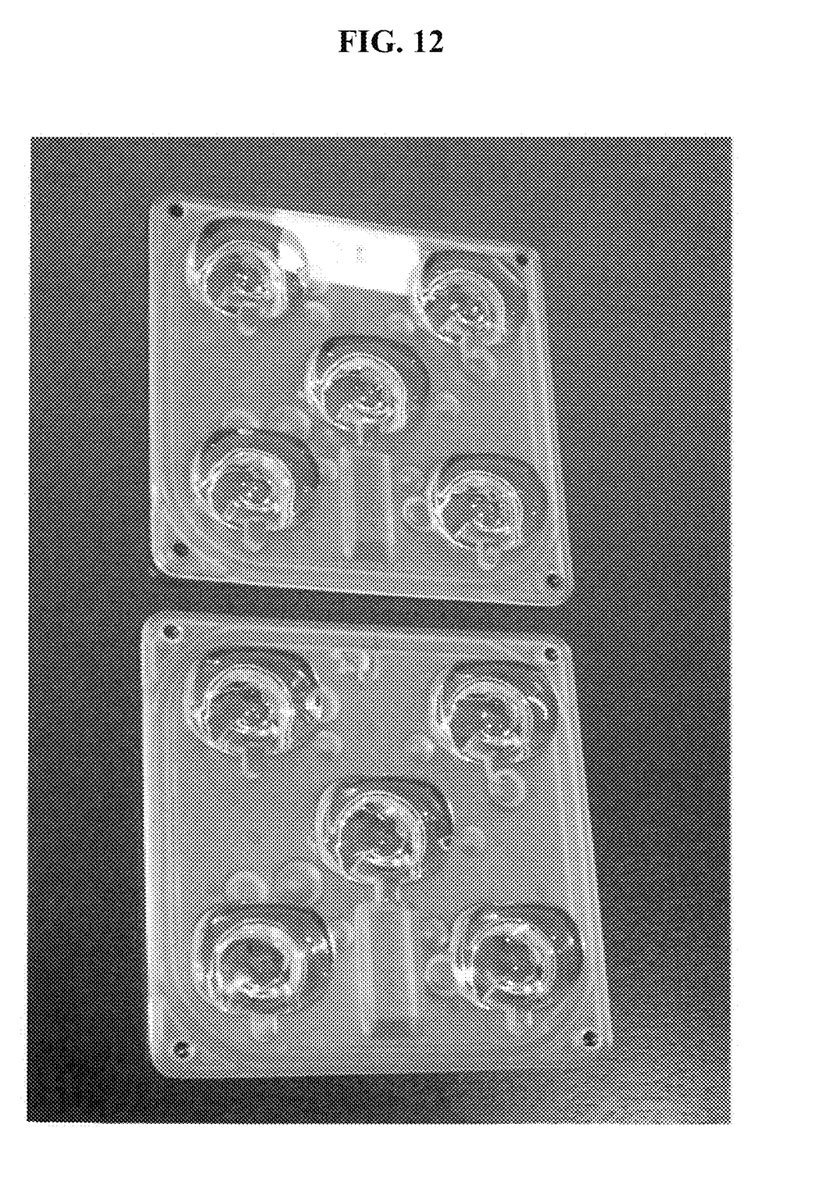
FIG. 12 is a photograph of optical members made of acrylic.

FIG. 12 is included simply to illustrate the importance of this invention with respect to achieving long life with a multi-lens optical member of polycarbonate or other materials which tend to suffer UV degradation. The optical members in FIG. 12 are of an acrylic, a material which is much more expensive, far less susceptible to UV degradation but considerably more fragile than polycarbonate, so less desirable for outdoor lighting uses. Neither of the optical members in FIG. 12 has any UV inhibitor. The optical member shown at the bottom of FIG. 12 is shown prior to any exposure to weather, while the optical member shown at the top of FIG. 12 is after accelerated exposure to UV, humidity and elevated temperature. As can be seen, the optical member at the top has some, but very minimal, degradation, reflecting the excellent anti-degradation properties of acrylics. In comparing the upper left image of FIG. 11 and the upper image of FIG. 12, it can be seen that the infused polycarbonate exhibits even less degradation than acrylic after similar exposure.

As can be seen by FIGS. 11-12, infusing the UV inhibitor onto the outer surface is more effective and also only uses roughly ⅓the amount of UV inhibitor product than compounding does. (Compounding is adding the inhibitor throughout the lens/polymeric carrier material rather than just on the outer surface.) Infused additives also have a longer life and also don't impact optics for lenses like additives in coatings do. Infusing is carried out by submerging the optical carrier using an immersive process with an aqueous-based solvent system with organic dyes and additives. The additives can be deposited up to seven mils deep into the optical carrier. The solvents are reclaimed and continually reused. There is no additional curing time which is needed after the immersion. The UV inhibitor may also be applied through a spraying process.

Optical members can be formed by a multi-shot injection molding process and in such instances the surface infusion may occur after formation of a lens portion including a light-output surface (a surface through which light exits the lens). This is then followed by formation of light-entrance surfaces (a surface through which light enters the lens). The lens portion including the light-entrance surface may then be formed of a material different than the lens portion including the light-output surface. For example, the infused lens portion can be of polycarbonate and the later formed portion can be of a liquid silicone resin (LSR). This is disclosed in more detail in Ser. Nos. 13/843,649 and 13/843,928 filed on Mar. 15, 2013 both of which are co-owned by the Applicant.

The polymeric material of lens 20, i.e., the material of outer layer 22 and flange 24, can be either polycarbonate or an acrylic. The polymeric material of carrier portion 26 is a polycarbonate. A wide variety of optical-grade acrylics can be used, and are available from various sources, including: Mitsubishi Rayon America, Inc.; Arkema Group; and Evonik Cyro LLC. A wide variety of polycarbonate materials can be used, and are available from various sources, such as Bayer and Sabic. Likewise, UV infusion materials are available from various sources such as OmniFusion/Radco Infusion Technologies.

Figure 1C:
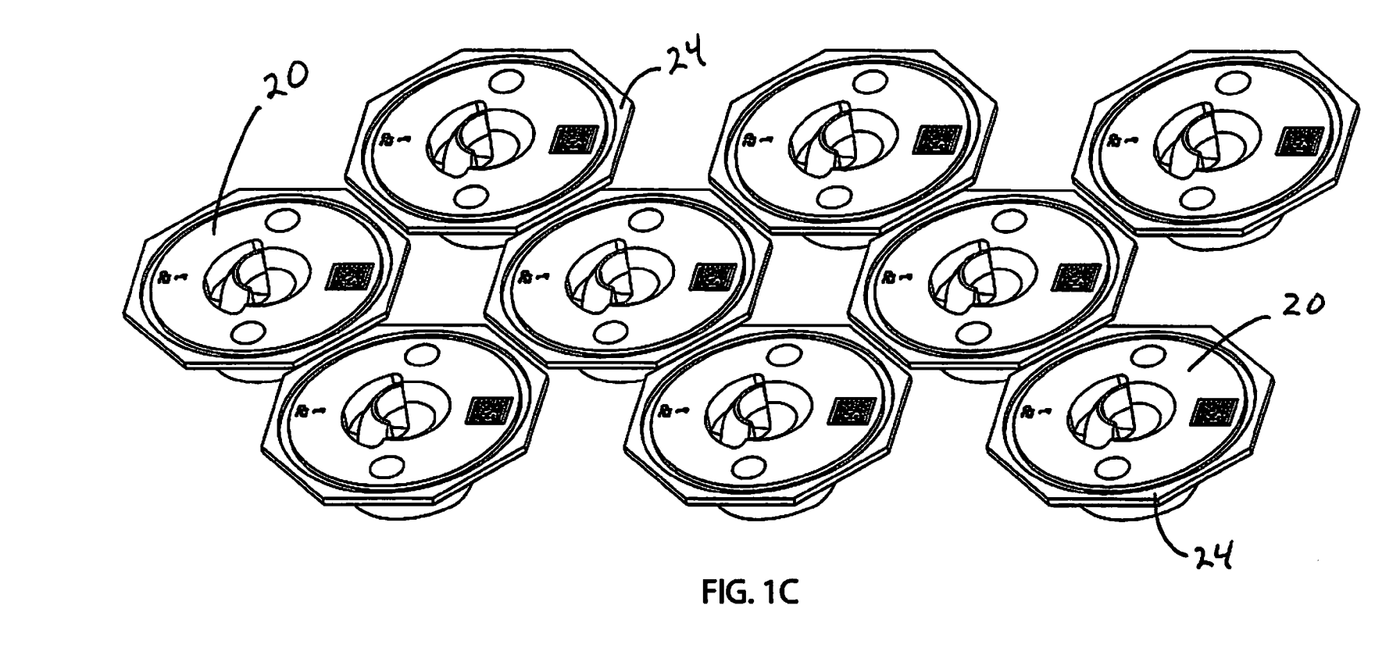
FIG. 1C is a perspective view illustrating the positioning of secondary lenses as placed in injection-molding apparatus. The injection-molding apparatus is not shown in FIG. 1C.
Figures 2, 3:
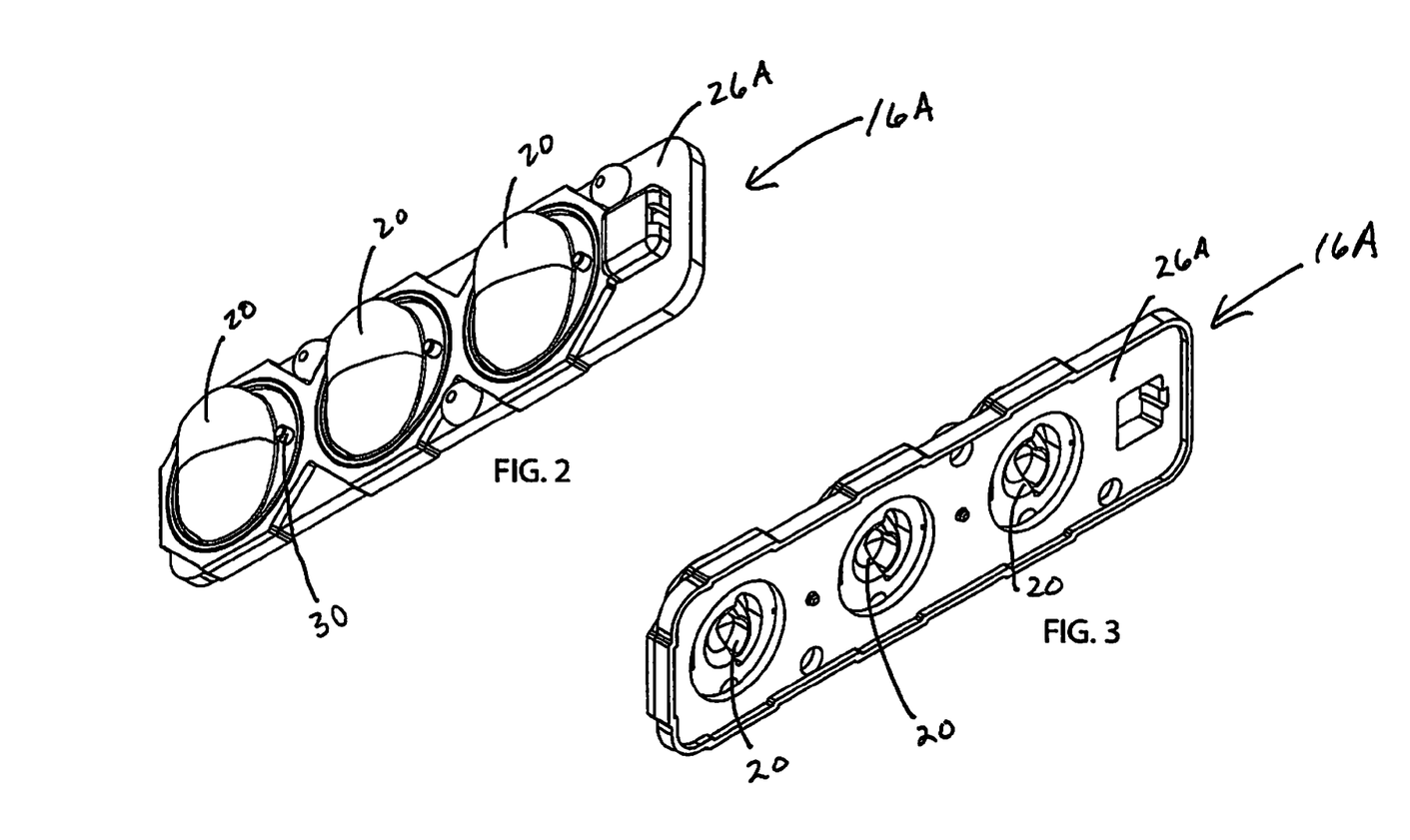
FIG. 2 is a perspective view of one such one-piece optical member, showing its light-output side.
FIG. 3 is a perspective view of such optical member, but showing its light-input side.
Figure 4:
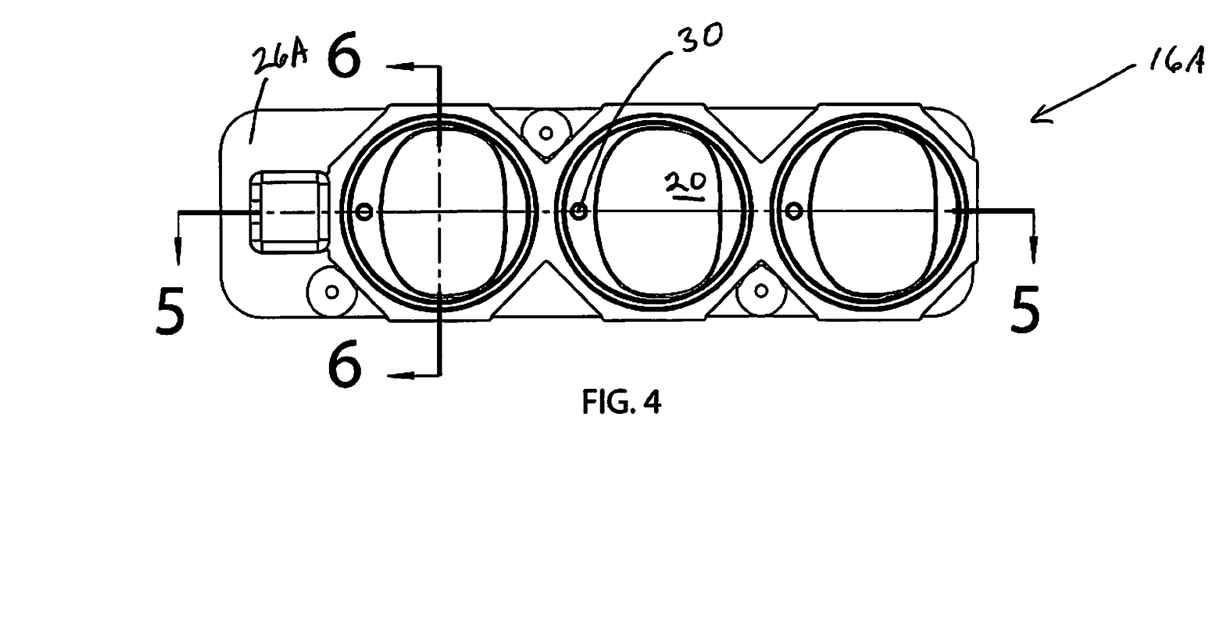
FIG. 4 is a plan view of such optical member.
Figure 5:
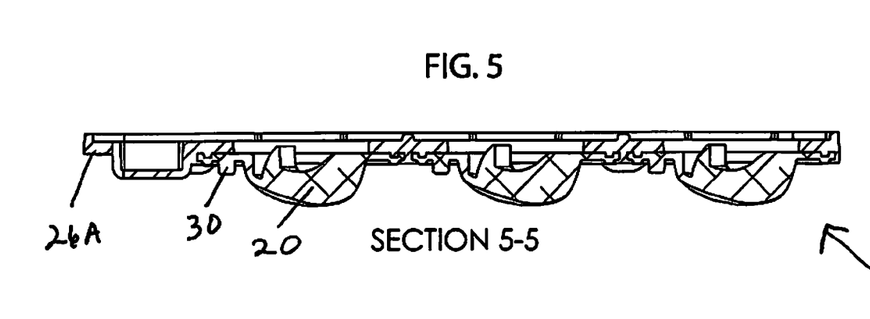
FIG. 5 is a side sectional view taken along section 5-5 as indicated in FIG. 4.
Figure 6:
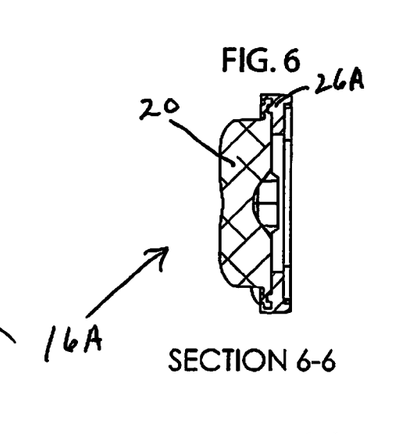
FIG. 6 is an end sectional view taken along section 6-6 as indicated in FIG. 4.

FIG. 1C illustrates the positioning of secondary lenses 20 as placed in injection-molding apparatus (not shown). After such placement, carrier portion 26 is injection molded onto lens flanges 24 to form one-piece optical member 16. As already indicated, carrier portion 26 surrounds lenses 20 and overlaps and is molded onto lens flanges 24. After injection-molding steps are complete, lenses 20, lens flanges 24 and carrier portion 26 are infused with ultraviolet inhibitor 50.

FIGS. 2-7 illustrate aspects of an alternative one-piece optical member 16A which has three lenses 20 and a carrier portion 26A. The only significant difference between one-piece optical members 16 and 16A is the number of lenses.

Figure 7:
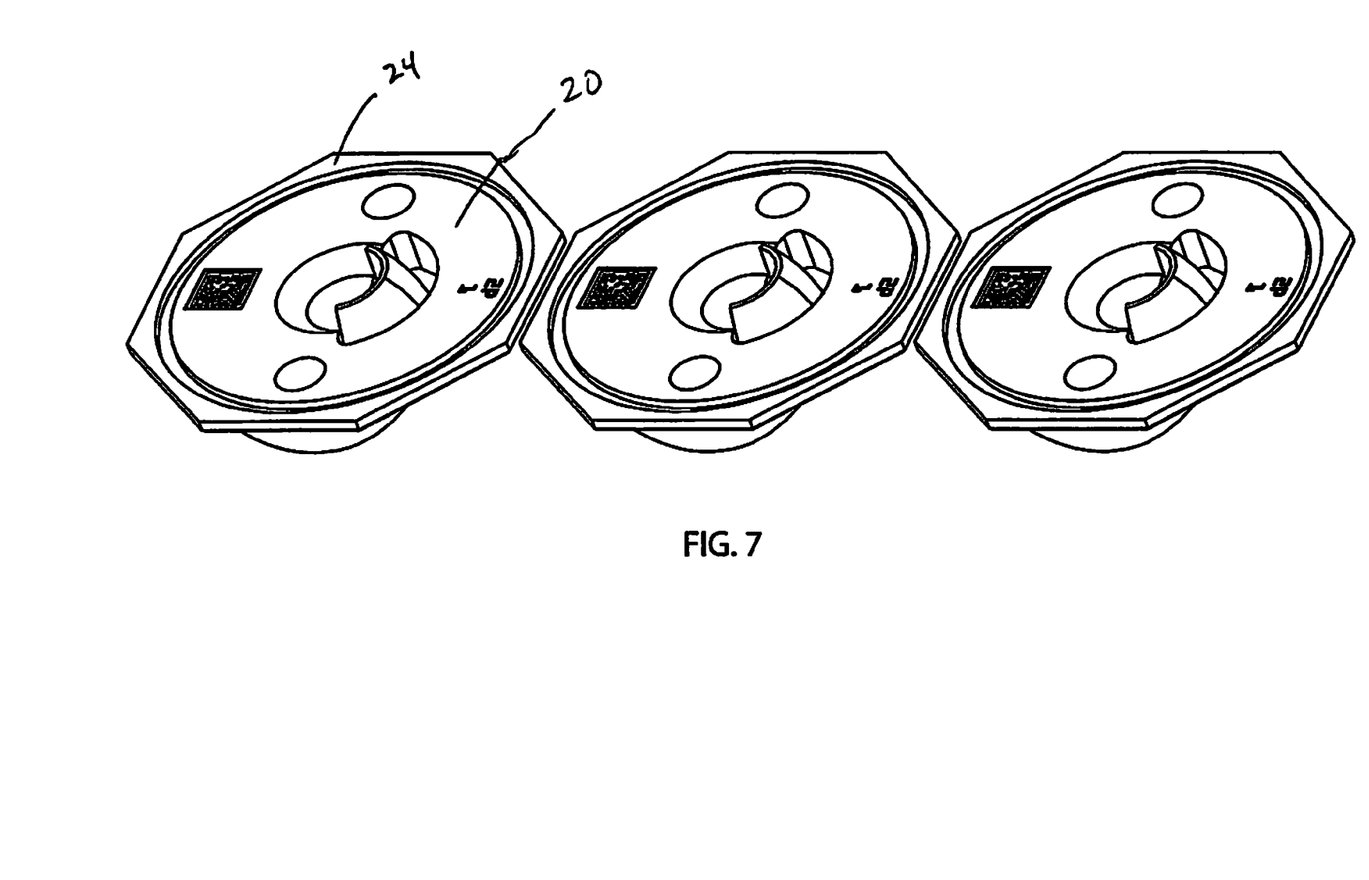
FIG. 7 is an enlarged perspective view of the three individual lenses of the one-piece optical member arranged as they would be in a mold prior to the polymeric carrier portion being injection molded onto the lens flanges, to complete the one-piece optical member.

FIG. 7, as with FIG. 1C, illustrates the positioning of secondary lenses 20 as placed in injection-molding apparatus. Accurate placement into the injection-molding apparatus is facilitated by indexing features in the form of posts 30 (see FIGS. 2, 4 and 5) which extend from lens flange 24 and mate with corresponding recesses in the mold. (FIGS. 1A and 1B also show such indexing feature.)

Figure 8:
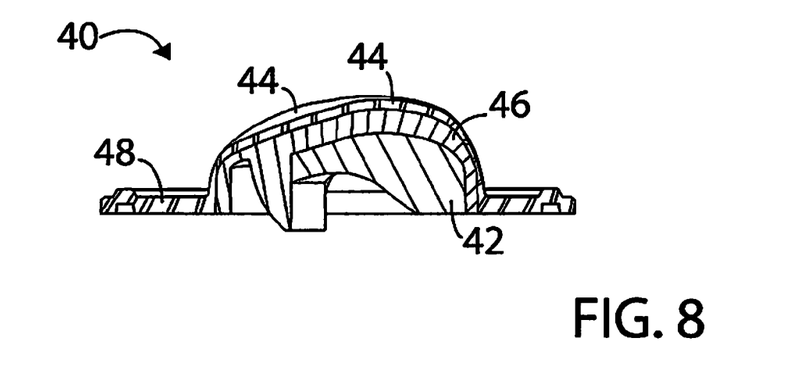
FIG. 8 is a central cross-sectional view of the lens of an alternative embodiment, such alternative lens having three layers.
Figure 9:
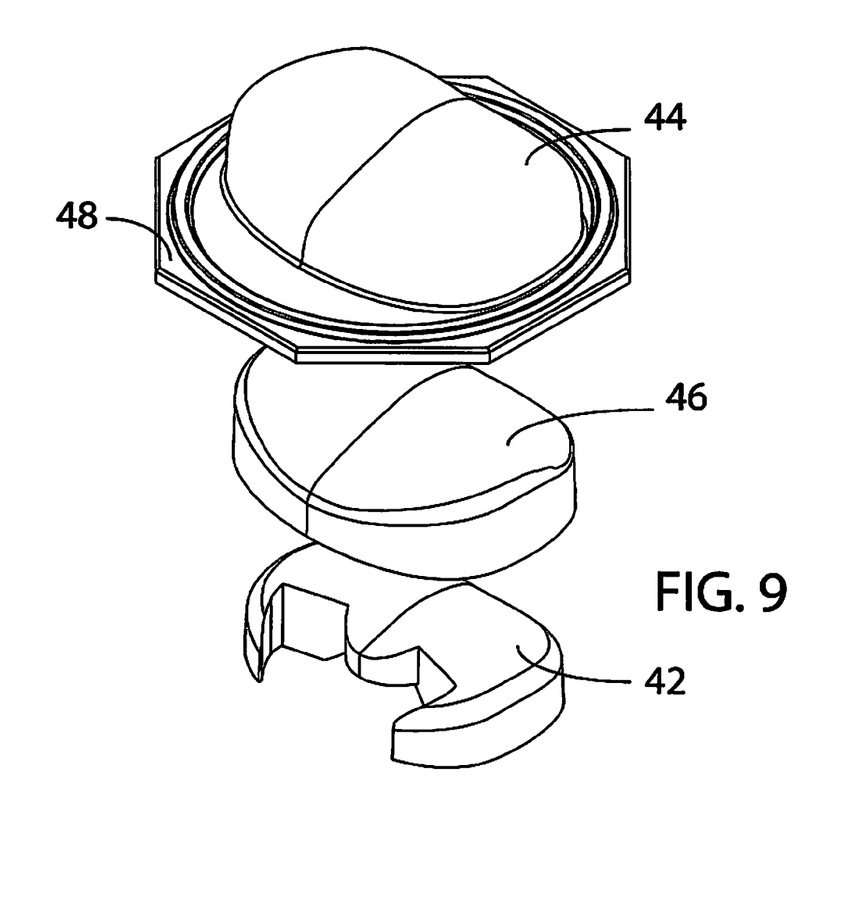
FIG. 9 is an exploded perspective view of the lens of FIG. 18, serving to illustrate the shapes of the layers of such lens.

FIGS. 8 and 9 illustrate an alternative lens 40 which is a multi-layer lens. Lens 40 has three layers, including an innermost layer 42, an outermost layer 44, and an intermediate layer 46. The layer shapes are illustrated in the FIG. 9 exploded view. As seen in FIGS. 8 and 9, lens 40 has an optical footprint, referred to above, and innermost layer 42 is less than coextensive with the lens optical footprint.

Outermost layer 44 of lens 40 includes a flange 48 extending beyond the optical footprint of lens 40.

The layers of each pair of adjacent layers of lens 40 are joined together permanently at their interface by overmolding. Lens 40 may be formed by a series of injection-molding steps. For example, innermost layer 42 is first formed by injection molding. Then, at the next injection-molding station, intermediate layer 46 is overmolded with innermost layer 42. And then, at a third injection-molding station, outermost layer 44 is overmolded onto the previously overmolded layers. After the completion of injection-molding steps, one-piece optical member 16 is infused with ultraviolet inhibitor 50. Ultraviolet inhibitor 50 is used best with lenses 20, lens flanges 24 and carrier portion 26 made of polycarbonate but can also be used with acrylic.

The layers of lens 40 may be of the same or differing polymeric materials and injection-moldable materials may be chosen having different indices of refraction. One or more of the lens layers may be polycarbonate or an acrylic and at least one other lens layer may be of a different polymeric material. All lens layers may also be polycarbonate.

While the principles of this invention have been described in connection with specific embodiments, it should be understood clearly that these descriptions are made only by way of example and are not intended to limit the scope of the invention.

The invention claimed is:

1. An LED light fixture comprising a mounting surface supporting a circuit board with a plurality of light sources and a one-piece optical member including a plurality of lenses each in alignment with a corresponding one of the plurality of light sources, and surrounded with a lens flange integral with each lens and secured by a carrier portion, the one-piece optical member having an outer surface infused with an ultraviolet inhibitor to less than throughout a full depth of the one-piece optical member, thereby increasing long-term weathering performance, the infused outer surface including an outer layer of each lens, an outer layer of the lens flanges and an outer layer of the carrier portion.

2. The LED light fixture of claim 1 wherein the one-piece optical member has an inner surface all of which is also infused with the ultraviolet inhibitor.

3. The LED light fixture of claim 1 wherein the one-piece optical member is of a polycarbonate.

4. The LED light fixture of claim 1 wherein each of the plurality of lenses is of a first polymeric material and the carrier portion is of a second polymeric material.

5. The LED light fixture of claim 1 wherein each lens has at least two layers of the same polymeric material.

6. The LED light fixture of claim 5 wherein at least two of the lens layers are of different polymeric materials.

7. The LED light fixture of claim 6 wherein one of the lens layers is of a polycarbonate and at least one other lens layer is of an acrylic or a cyclic olefin copolymer (COC) material.

8. The LED light fixture of claim 5 wherein each lens has three layers of the polymeric material.

9. An LED light fixture comprising:
a mounting surface supporting a circuit board with a plurality of LED light sources spaced thereon; and
a one-piece optical member including a plurality of lenses each in alignment with a corresponding one of the light sources and surrounded with a lens flange integral with each lens and secured by a polymeric carrier portion, the one-piece optical member having an entire outer surface infused with an ultraviolet inhibitor to less than throughout a full depth of the optical member, thereby increasing long-term weathering performance.

10. The LED light fixture of claim 9 wherein the one-piece optical member has an inner surface all of which is also infused with the ultraviolet inhibitor.

11. The LED light fixture of claim 9 wherein the one-piece optical member is a polycarbonate.

12. An LED light fixture comprising a mounting surface supporting a circuit board with a plurality of light sources spaced thereon, and a one-piece optical member including a plurality of secondary lenses each in alignment with a corresponding one of the plurality of the light sources, the one-piece optical member has an entire outer surface infused with an ultraviolet inhibitor to less than throughout a full depth of the optical member, thereby increasing long-term weathering performance.

13. The LED light fixture of claim 12 wherein the one-piece optical member has an inner surface all of which is also infused with the ultraviolet inhibitor.

14. The LED light fixture of claim 12 wherein the one-piece optical member is a polycarbonate.

15. A one-piece optical member comprising a plurality of spaced lenses and a carrier portion securing them in place thereon, the one-piece optical member has an outer surface infused with an ultraviolet inhibitor to less than throughout a full depth of the one-piece optical member, thereby increasing long-term weathering performance.

16. The LED light fixture of claim 15 wherein each lens of the one-piece optical member has:
an infused lens portion including the light-output surface; and
another lens portion including a light-entrance surface and being free of the ultraviolet inhibitor.

17. The LED light fixture of claim 15 wherein the infused portion of the one-piece optical member is of polycarbonate.

18. A method for manufacturing an optical member having a plurality of spaced lenses, the method comprising the steps of:
providing a plurality of lenses each of which has a light-entrance surface and a light-output surface; and
infusing the light-output surface of each of the plurality of the lenses with an ultraviolet inhibitor to less than throughout the entire lens, thereby increasing long-term weathering performance.

19. The method of claim 18 wherein:
the plurality of lenses are of polycarbonate; and
the infusing is by submersing into a liquid solvent system.

20. The method of claim 18 wherein the plurality of the lenses have at least one lens layer of a first polymeric material which extends into lens flanges overmolded with a carrier portion which surrounds each of the lenses and being of a second polymeric material.

21. The method of claim 20 wherein the second polymeric material is a polycarbonate.

22. The method of claim 18 wherein the providing step further includes overmolding a lens portion with a light-entrance surface onto a corresponding one of lens portions including the light-output surface infused with an ultraviolet inhibitor.

23. The method of claim 22 wherein the infused lens portion is of polycarbonate and the lens portion with a light-entrance surface is a liquid silicone resin (LSR).

* * * * *